US012775281B2

(12) United States Patent
Pastre et al.

(10) Patent No.: US 12,775,281 B2
(45) Date of Patent: Oct. 27, 2026

(54) METHOD AND SYSTEM FOR CALCULATING AN EXIT TRAJECTORY FOR AN AIRCRAFT FROM A WEATHER ALERT SITUATION

(71) Applicant: Airbus SAS, Blagnac (FR)

(72) Inventors: Thomas Pastre, Toulouse (FR); Fabien Perrin, Toulouse (FR)

(73) Assignee: Airbus SAS, Blagnac (FR)

( * ) Notice: Subject to any disclaimer, the term of this patent is extended or adjusted under 35 U.S.C. 154(b) by 155 days.

(21) Appl. No.: 18/602,516

(22) Filed: Mar. 12, 2024

(65) Prior Publication Data

US 2024/0310853 A1 Sep. 19, 2024

(30) Foreign Application Priority Data

Mar. 14, 2023 (FR) ....................................... 2302353

(51) Int. Cl.
*G05D 1/617* (2024.01)
*G05D 109/20* (2024.01)

(52) U.S. Cl.
CPC ......... *G05D 1/621* (2024.01); *G05D 2109/20* (2024.01)

(58) Field of Classification Search
CPC ...... G05D 1/621; G05D 2109/20; G08G 5/76; G08G 5/59; G08G 5/55; G08G 5/34
See application file for complete search history.

(56) References Cited

U.S. PATENT DOCUMENTS

| | | | | |
|---|---|---|---|---|
| 2009/0132103 | A1* | 5/2009 | Marty | G05D 1/106 701/3 |
| 2015/0332490 | A1* | 11/2015 | Coulmeau | G08G 5/76 701/3 |
| 2022/0204180 | A1* | 6/2022 | Sellmann | G01C 23/005 |
| 2022/0350346 | A1 | 11/2022 | Pastre et al. | |

FOREIGN PATENT DOCUMENTS

EP 4083966 A1 11/2022

OTHER PUBLICATIONS

French Search Report for corresponding French Patent Application No. 2302353 dated Oct. 25, 2023.

* cited by examiner

*Primary Examiner* — Navid Z. Mehdizadeh
*Assistant Examiner* — Shelley Marie Osterhout
(74) *Attorney, Agent, or Firm* — Greer, Burns & Crain, Ltd.

(57) ABSTRACT

An automatic trajectory generation method for an aircraft in flight to exit a meteorological alert situation which: obtains polygons representative of meteorological obstacles; defines two circles centered to the right and to the left with respect to a current in-flight position, of a minimum radius in accordance with the operational state of the aircraft; identifies, for each polygon, candidate external sides for the aircraft to exit; defines straight lines perpendicular to the candidate external sides and tangent to one or both of the circles; determines, for each straight line, a candidate safety position, which is located at a margin distance outside any polygon; forms candidate exit trajectories between the current in-flight position and each candidate safety position; and selects the candidate trajectory which minimizes a time of exposure of the aircraft to any meteorological obstacle. Also a system and an aircraft with such a system.

11 Claims, 8 Drawing Sheets

Fig. 4A
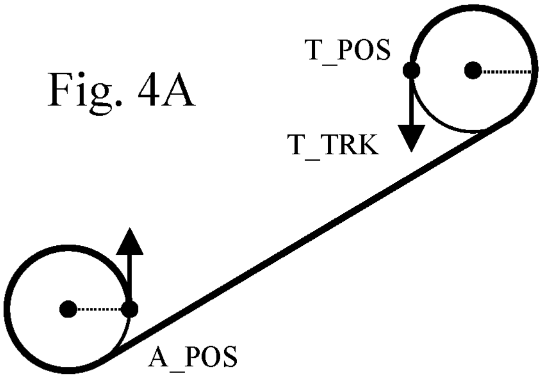
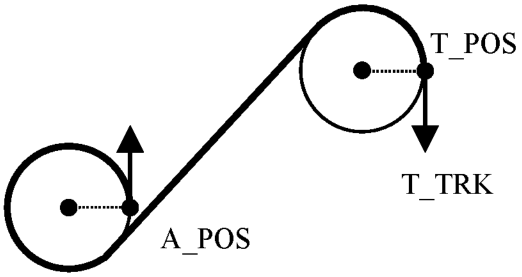
Fig. 4B
Fig. 4C
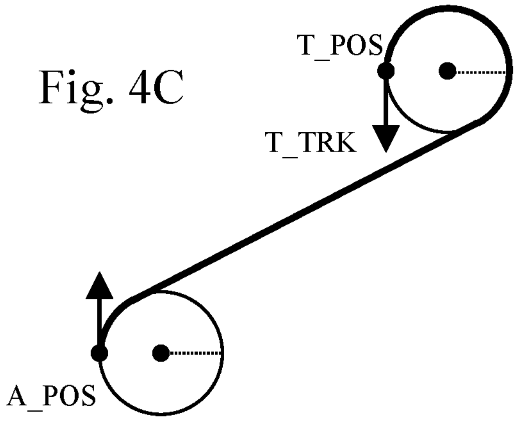
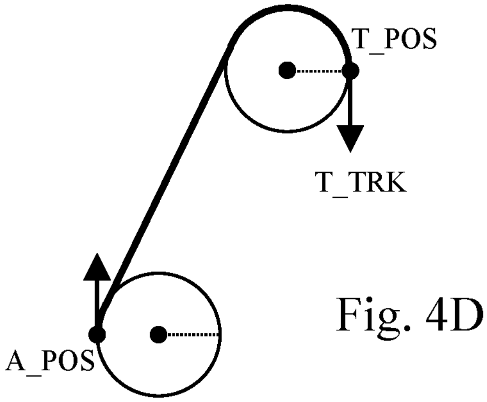
Fig. 4D
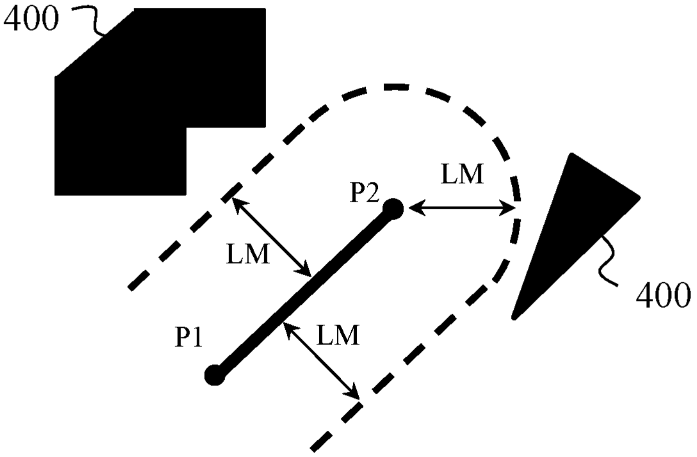
Fig. 4E

METHOD AND SYSTEM FOR CALCULATING AN EXIT TRAJECTORY FOR AN AIRCRAFT FROM A WEATHER ALERT SITUATION

CROSS-REFERENCES TO RELATED APPLICATIONS

This application claims the benefit of French Patent Application Number 2302353 filed on Mar. 14, 2023, the entire disclosure of which is incorporated herein by way of reference.

FIELD OF THE INVENTION

The present invention relates to a system for automatically calculating a trajectory to be followed in order for an aircraft to exit a meteorological alert situation. The present invention also relates to a system for automatically calculating a trajectory to be followed in order to make the aircraft transition from a current in-flight geographical position, where the aircraft is caught in a meteorological alert situation, towards a georeferenced destination and in a direction to be followed to the destination.

BACKGROUND OF THE INVENTION

When an aircraft is in flight, it may be desirable to provide automatic assistance in order to automatically determine a trajectory which makes it possible to bring the aircraft to a georeferenced destination. Many obstacles have to be taken into account when determining a trajectory which is flyable: the relief of the terrain, meteorological obstacles, military no-fly zones, the operational state of the aircraft (cabin depressurization, engine offline, etc.). A flyable trajectory is a trajectory which has, at all points, a minimum (or predetermined) distance margin with respect to any identified obstacle (relief, etc.) and which the aircraft can follow given its operational state (potential depressurization, loss of an engine, etc.). It is notably desirable to provide such automatic assistance in the context of piloting drones.

It is desirable to take account of the fact that, in its current in-flight position, the aircraft is caught in a meteorological alert situation, notably either because the aircraft is inside a storm cloud or because the aircraft is surrounded by storm clouds.

It is thus desirable to provide a solution which makes it possible to automatically find an exit trajectory from the meteorological alert situation, which has low consumption in terms of computing resources, and which minimizes the exposure of the aircraft to meteorological risks.

SUMMARY OF THE INVENTION

What is proposed here, then, is a first trajectory generation method in order for an aircraft in flight to exit a meteorological alert situation, the method being implemented by an automatic trajectory generation system in the form of electronic circuitry, the method comprising the following steps:

- obtaining one or more polygons of the meteorological alert situation which are representative of at least one respective meteorological obstacle to be overcome;
- defining two tangential circles with respect to a current flight direction of the aircraft, one being centered to the right and the other being centered to the left with respect to a current in-flight position of the aircraft, the radius of the circles being a minimum radius of a turn which the aircraft can perform in view of its operational state;
- identifying, for each polygon of the meteorological alert situation, candidate external sides which are candidates for the aircraft to exit the meteorological alert situation;
- defining straight lines which are perpendicular to the candidate external sides and which are tangential to one and/or the other of the circles;
- determining, for each straight line, a candidate safety position, which is located on said straight line at a distance at least equal to a predetermined lateral margin outside any polygon representative of a meteorological obstacle of the meteorological alert situation;
- forming candidate trajectories, in order for the aircraft to exit the meteorological alert situation, between the current in-flight position of the aircraft and each candidate safety position following the straight line on which the candidate safety position in question is located and, previously, a circle portion until said circle is tangential to the straight line in question; and
- choosing between the candidate trajectories, selecting the most promising candidate trajectory in view of a heuristic where minimizing a time of exposure of the aircraft to any meteorological obstacle of the meteorological alert situation prevails.

Thus, an exit trajectory from the meteorological alert situation is found, automatically, which has low consumption in terms of computing resources, and minimizes the exposure of the aircraft to meteorological risks.

According to one particular embodiment, the meteorological alert situation is formed from a meteorological obstacle in which the current in-flight position of the aircraft is located, the current in-flight position of the aircraft thus being within a polygon of the meteorological alert situation.

According to one particular embodiment, the meteorological alert situation is formed from several meteorological obstacles surrounding the current in-flight position of the aircraft, the current in-flight position of the aircraft thus being surrounded by polygons of the meteorological alert situation.

According to one particular embodiment, the method comprises the following step:

- merging the polygons of the meteorological alert situation surrounding the current in-flight position of the aircraft, before identifying the candidate external sides.

According to one particular embodiment, the method further comprises the following step:

- obtaining one or more other polygons which are representative of at least one no-fly military area or relief obstacle;
- and the method being such that each candidate safety position is located at a distance at least equal to the predetermined lateral margin of any polygon.

According to one particular embodiment, the method comprises the following step:

- filtering the candidate trajectories, so as to exclude any candidate trajectory which does not guarantee the predetermined lateral margin with respect to any other said polygon.

Also proposed is a second trajectory generation method for bringing an aircraft in flight from a current in-flight position of the aircraft to a georeferenced destination, the method being implemented by an automatic trajectory generation system in the form of electronic circuitry, the method comprising the following steps:

obtaining polygons representative of obstacles potentially encountered by the aircraft from the current position of the aircraft to the georeferenced destination;

when the current in-flight position of the aircraft is not in a meteorological alert situation, searching for a trajectory in order to bring the aircraft from the current in-flight position of the aircraft to the georeferenced destination, by bypassing vertices of the polygons which are obtained, by maintaining a predetermined lateral margin from any polygon;

when the current in-flight position of the aircraft is in a meteorological alert situation, executing the first method summarized above in any one of its embodiments in order to obtain a trajectory in order to bring the aircraft from the current in-flight position of the aircraft to a safety position, and searching for a trajectory in order to bring the aircraft from the safety position to the georeferenced destination, by bypassing vertices of the polygons which are obtained, by maintaining a predetermined lateral margin from any polygon.

Also proposed is a first automatic trajectory generation system configured to automatically generate a trajectory in order for an aircraft in flight to exit a meteorological alert situation, the automatic trajectory generation system being in the form of electronic circuitry configured to:

obtain one or more polygons of the meteorological alert situation which are representative of at least one respective meteorological obstacle to be overcome;

define two tangential circles with respect to a current flight direction of the aircraft, one being centered to the right and the other being centered to the left with respect to a current in-flight position of the aircraft, the radius of the circles being a minimum radius of a turn which the aircraft can perform in view of its operational state;

identify, for each polygon of the meteorological alert situation, candidate external sides which are candidates for the aircraft to exit the meteorological alert situation;

define straight lines which are perpendicular to the candidate external sides and which are tangential to one and/or the other of the circles;

determine, for each straight line, a candidate safety position, which is located on said straight line at a distance at least equal to a predetermined lateral margin outside any polygon representative of a meteorological obstacle of the meteorological alert situation;

form candidate trajectories, in order for the aircraft to exit the meteorological alert situation, between the current in-flight position of the aircraft and each candidate safety position following the straight line on which the candidate safety position in question is located and, previously, a circle portion until said circle is tangential to the straight line in question; and choose between the candidate trajectories, selecting the most promising candidate trajectory in view of a heuristic where minimizing a time of exposure of the aircraft to any meteorological obstacle of the meteorological alert situation prevails.

Also proposed is a second automatic trajectory generation system configured to automatically generate a trajectory in order to bring an aircraft in flight from a current in-flight position of the aircraft to a georeferenced destination, the automatic trajectory generation system being in the form of electronic circuitry configured to:

obtain polygons representative of obstacles potentially encountered by the aircraft from the current position of the aircraft to the georeferenced destination;

when the current in-flight position of the aircraft is not in a meteorological alert situation, search for a trajectory in order to bring the aircraft from the current in-flight position of the aircraft to the georeferenced destination, by bypassing vertices of the polygons which are obtained, by maintaining a predetermined lateral margin from any polygon;

when the current in-flight position of the aircraft is in a meteorological alert situation, the electronic circuitry is configured, according to the first automatic trajectory generation system of claim 8, to obtain a trajectory in order to bring the aircraft from the current in-flight position of the aircraft to a safety position, and the electronic circuitry is further configured to search for a trajectory in order to bring the aircraft from the safety position to the georeferenced destination, by bypassing vertices of the polygons which are obtained, by maintaining a predetermined lateral margin from any polygon.

Also proposed is an aircraft comprising an automatic trajectory generation system according to any one of the embodiments presented above.

Also proposed is a computer program comprising instructions for implementing the first method or the second method as outlined above according to any one of their embodiments when said instructions are executed by a processor. Also proposed is an information storage medium storing instructions for implementing the first method or the second method as outlined above according to any one of their embodiments when said instructions are read from the information storage medium and executed by a processor.

BRIEF DESCRIPTION OF THE DRAWINGS

The abovementioned features of the invention, as well as others, will become more clearly apparent from reading the following description of at least one example of an embodiment, said description being given in relation to the appended drawings, in which:

FIG. 4A schematically illustrates a first trajectory pattern between a current in-flight position of the aircraft and a destination to be reached;

FIG. 4B schematically illustrates a second possible trajectory pattern between a current in-flight position of the aircraft and a destination to be reached;

FIG. 4C schematically illustrates a third possible trajectory pattern between a current in-flight position of the aircraft and a destination to be reached;

FIG. 4D schematically illustrates a fourth possible trajectory pattern between a current in-flight position of the aircraft and a destination to be reached;

FIG. 4E schematically illustrates a top view of a lateral margin to be respected in order to be able to consider a trajectory to be flyable;

DETAILED DESCRIPTION OF THE PREFERRED EMBODIMENTS

Figure 1:
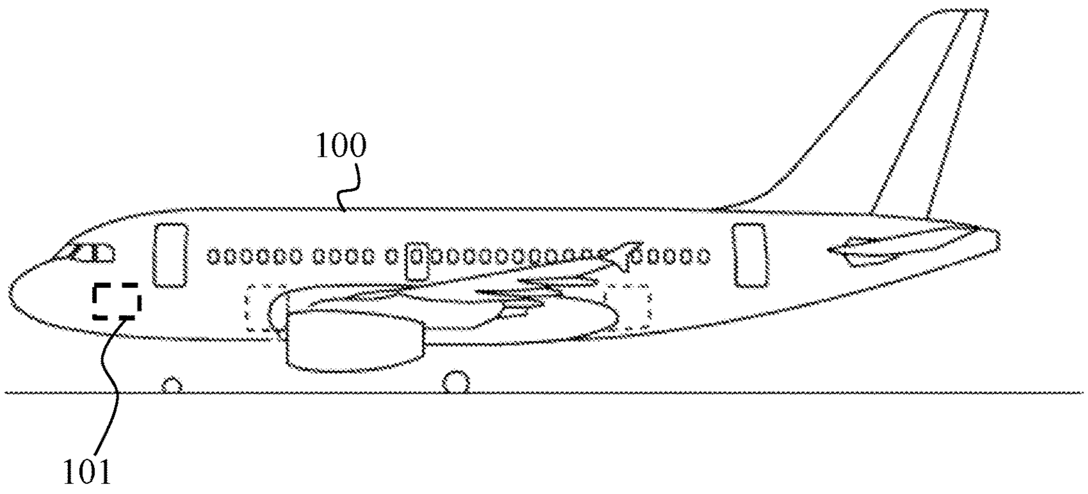
FIG. 1 schematically illustrates a side view of an aircraft equipped with an automatic trajectory generation system.

FIG. 1 schematically illustrates a side view of an aircraft 100 equipped with an automatic trajectory generation (ATG) system 101.

The ATG system 101 is an item of on-board electronic equipment. For example, the ATG system 101 forms part of electronic circuitry of the avionics of the aircraft 100. Preferably, the ATG system 101 is integrated into a computer of the aircraft 100, for example the flight management system (FMS) of the aircraft 100 or another trajectory calculation system distinct from the flight management system (FMS).

The ATG system 101 is a piloting assistance system for determining, in real time, a safe, flyable trajectory to be followed to bring the aircraft 100, when it is in flight, from its current geographic position to a georeferenced destination such as, for example, an airport or a current aircraft carrier position.

Figure 2:
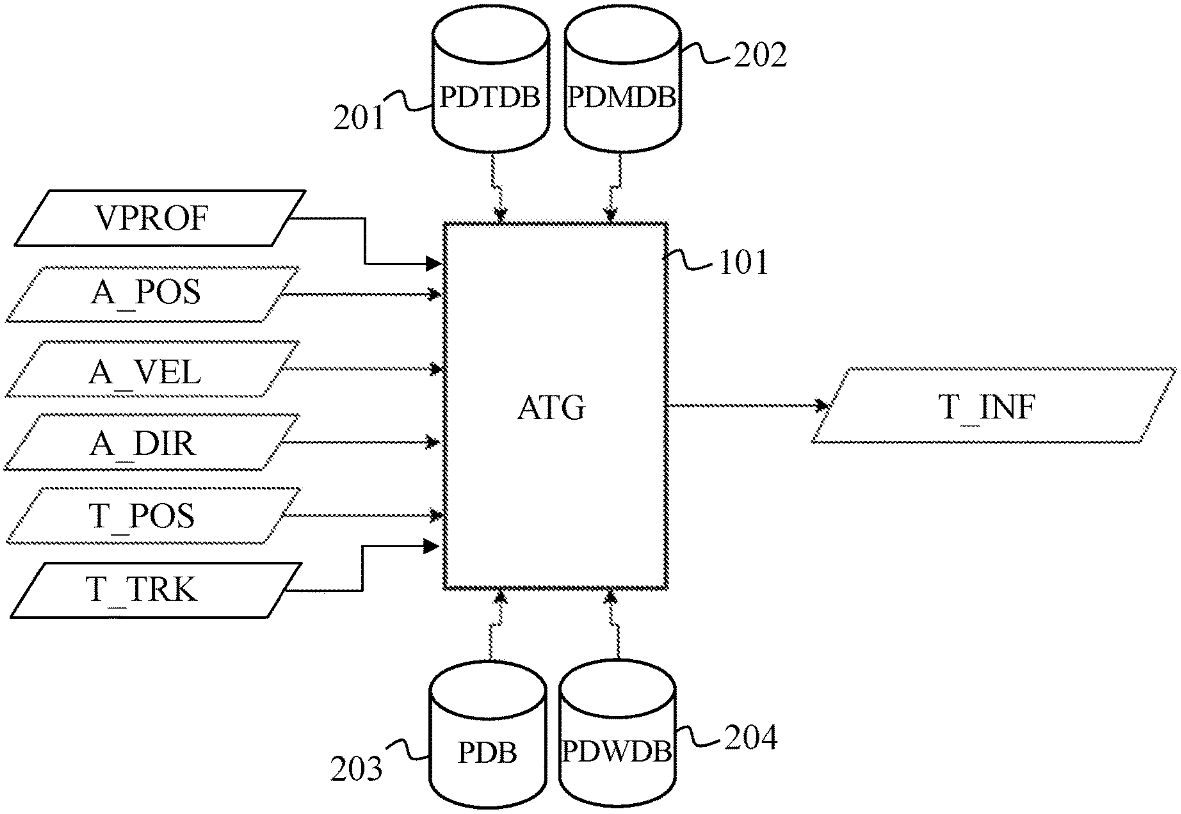
FIG. 2 schematically illustrates an arrangement of the automatic trajectory generation system.

The ATG system 101 is schematically illustrated in FIG. 2. The ATG system 101 is configured to take as input a set of information provided by the avionics: the current geographic position of the aircraft 100 (current in-flight position, labelled A_POS), the current speed or velocity of the aircraft 100 (labelled A_VEL), the current flight direction of the aircraft 100 (labelled A_DIR) as defined by the attitude of the aircraft 100, information on the geographic position of the destination (georeferenced destination, labelled T_POS) and information on the direction to be followed to the destination (labelled T_TRK). In one particular embodiment, the ATG system 101 is configured to further take as input a vertical trajectory profile to be respected to the destination (labelled VPROF).

The ATG system 101 is configured to provide trajectory information (labelled T_INF) as output.

Recall that a flyable trajectory is a trajectory which has, at all points, a minimum (or predetermined) distance margin with respect to any identified obstacle (relief, etc.) and which the aircraft 100 can follow, given its operational state (potential depressurization, loss of an engine, etc.).

In order to determine the trajectory information T_INF, the ATG system 101 further possesses information provided by one or more databases. For example, the ATG system 101 possesses more particularly: a PDTDB (polygon digital terrain database) 201, which provides terrain elevation information in the form of polygons by altitude bands; a PDMDB (polygon digital military database) 202, which provides georeferencing data, preferably by altitude bands, in the form of polygons of no-fly military areas; a PDWDB (polygon digital weather database) 204, which provides georeferenced information in the form of polygons, preferably by altitude bands, on areas to be avoided because of meteorological conditions (storm clouds, etc.).

Preferably, the ATG system 101 further possesses a PDB (performance database) 203, which provides information on the performance of the aircraft 100 according to its operational state.

The abovementioned databases may be fully integrated into a computer system of the aircraft 100. Before takeoff, the databases are updated, for example using an electronic flight bag (EFB). The databases may be integrated into a ground-based computer system, for example a data center of an airline for which the aircraft 100 operates. The databases are then updated through air-to-ground communications (AGCs). These two approaches may be combined, the databases being preloaded before takeoff and updated in flight, for example in order to take into account data evolutions in real time (weather conditions, etc.).

The PDTDB 201 contains descriptors of polygons representing layers of terrain. Each polygon is thus associated with a layer of altitude (between a lower layer bound and an upper layer bound). The set of polygons is a quantification (approximation) of the terrain and entirely covers the real terrain, which means that, if a trajectory avoids these polygonal obstacles, applying this trajectory in the real world also avoids the relief of the terrain.

The polygons representing a layer of terrain must do so faithfully, which means that they cannot enlarge the terrain to the point that flyable areas are considered to be obstacles and that safe trajectories are then considered to be dangerous and rejected by the ATG system 101. In addition, seen from above, the polygons representing the terrain of a layer must be entirely surrounded by the polygons representing the terrain in the lower layers. This requirement is necessary in order to suppose that, the higher an aircraft is, the less restrictive the relief of the terrain, which makes it possible to make computing simplifications which accelerate the search for trajectories.

Likewise, the military areas in the PDMDB 202 and the meteorological obstacles in the PDWDB 204 are represented in the form of polygons which result from a quantification (approximation) of these military areas and of these meteorological obstacles.

In the case of the military areas, a variable is preferably associated with the corresponding polygon descriptors and indicates whether the military area is open (flyover allowed) or closed (no-fly). This variable may be transmitted by radio to the aircraft 100 in flight in order to give notice of a change of status (open/closed) of such or such military area in real time.

Each polygon is defined by its edges and is associated with a floor altitude and a ceiling altitude (layer). Consequently, the databases store polygon descriptors, comprising edge descriptors including, for example, the following information:

Longitude and latitude of one vertex of the edge,
Longitude and latitude of the other vertex of the edge,
Floor altitude of the layer,
Ceiling altitude of the layer,
Identifier of a polygon to which the edge belongs,
Identifier of an edge within the polygon.

Each polygon descriptor may thus be formed from consecutive edge descriptors, preferably presented in order in the clockwise direction or in the anticlockwise direction of travel around the perimeter of the polygon in question.

In the case of meteorological obstacles, the corresponding polygon descriptors contain, for example, the following information:

Timestamp,

Overall speed of the obstacle, with direction of movement,

Growth factor.

In addition, to be more specific, each edge descriptor of the meteorological obstacle polygon may contain information on the velocity, or speed, of each vertex of the edge. Thus, by virtue of this information, the ATG system 101 is able to extrapolate, from the instant given by the timestamp and by virtue of a meteorological model, dynamic changes in the shape of the polygons in question.

Thus, when the ATG system 101 calculates a trajectory to be followed in order to make the aircraft 100 transition from a current in-flight geographic position towards a georeferenced destination, the ATG system 101 manipulates polygons so as to reduce needs in terms of computing resources.

One example of a hardware platform adapted to implement the ATG system 101 is described in detail below in relation to FIG. 9.

Figure 3:
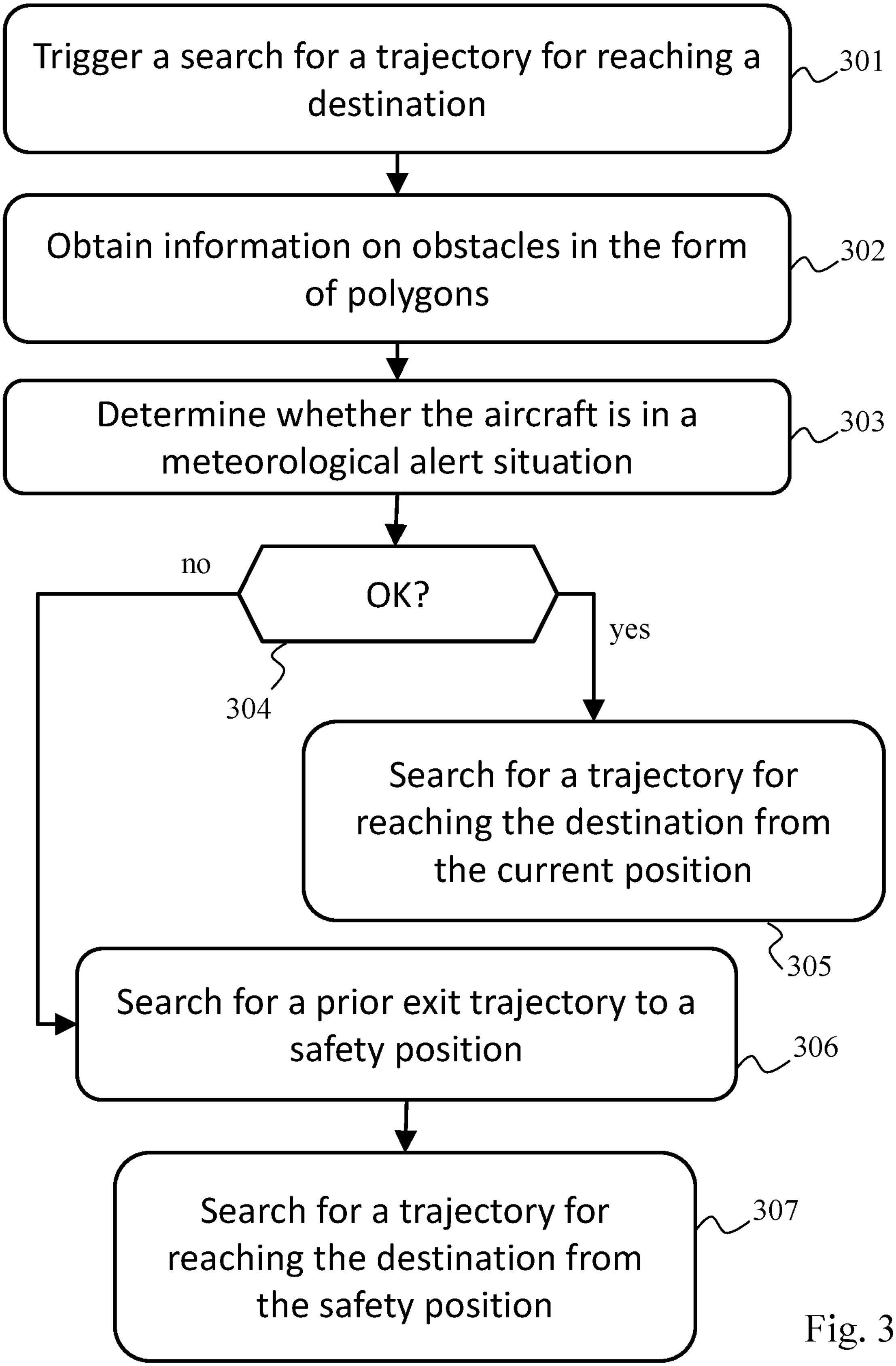
FIG. 3 schematically illustrates an algorithm for calculating a lateral trajectory aiming to bring the aircraft from a current in-flight position to a georeferenced destination.

FIG. 3 schematically illustrates an algorithm for calculating a lateral trajectory aiming to bring the aircraft 100 from a current in-flight position A_POS to a georeferenced destination T_POS.

In a step 301, the ATG system 101 triggers a search for a lateral trajectory aiming to bring the aircraft 100 from the current in-flight position A_POS to the georeferenced destination T_POS. The search for the lateral trajectory is initiated upon a pilot assistance request, for example upon an instruction originating from an item of control equipment of the cockpit of the aircraft 100 or from an item of equipment of the avionics of the aircraft 100.

In order to be able to provide a flyable trajectory which is easy to follow for the navigation instruments, the ATG system 101 constructs candidate trajectories composed exclusively of line segments and of arcs of circles the radius of which conforms to the performance of the aircraft 100 as collected in the PDB 203.

In a step 302, the ATG system 101 obtains information on obstacles (terrain, weather, military areas) in the form of polygons by layers of altitude. This information in the form of polygons is obtained from the abovementioned PDTDB 201, PDMDB 202 and PDWDB 204. For example, the ATG system 101 obtains information on obstacles present in a geographic area of predetermined surface area which includes the current in-flight position A_POS of the aircraft 100 and the georeferenced destination T_POS. This geographic area is preferably as small as possible, so as to obtain the information on obstacles present in a minimal geographic area including the current in-flight position A_POS of the aircraft 100 and the georeferenced destination T_POS. The ATG system 101 performs filtering in order to retain only the polygons which correspond to the altitude of the aircraft 100 or to a vertical trajectory profile to be followed by the aircraft 100. This filtering may, as a variant, be carried out externally to the ATG system 101, so that the ATG system 101 receives only the obstacles pertinent to the geographic area in question.

In a step 303, the ATG system 101 determines whether the aircraft 100 is in a meteorological alert situation. The ATG system 101 thus determines whether the aircraft 100 is caught in a meteorological alert situation, notably either because the aircraft 100 is inside a storm cloud or because the aircraft 100 is surrounded by storm clouds. The ATG system 101 detects the meteorological alert situation by virtue of the polygons in the PDWDB 204.

Figure 6A:
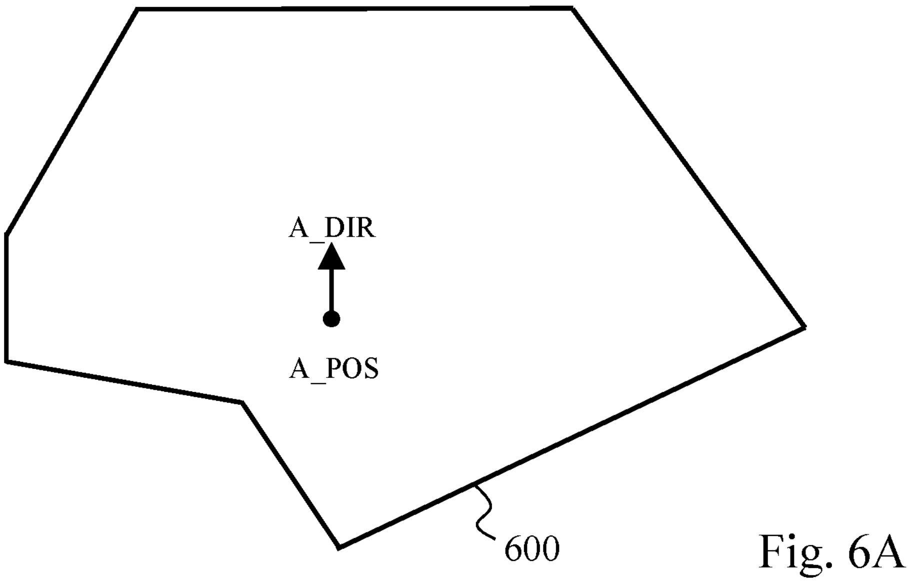
FIG. 6A schematically illustrates a first example of a situation where the aircraft is caught in a meteorological alert situation.

A first example of a meteorological alert situation is schematically illustrated in FIG. 6A, in which the aircraft 100 is inside a storm cloud represented by an obstacle in the form of a polygon 600.

Figure 6B:
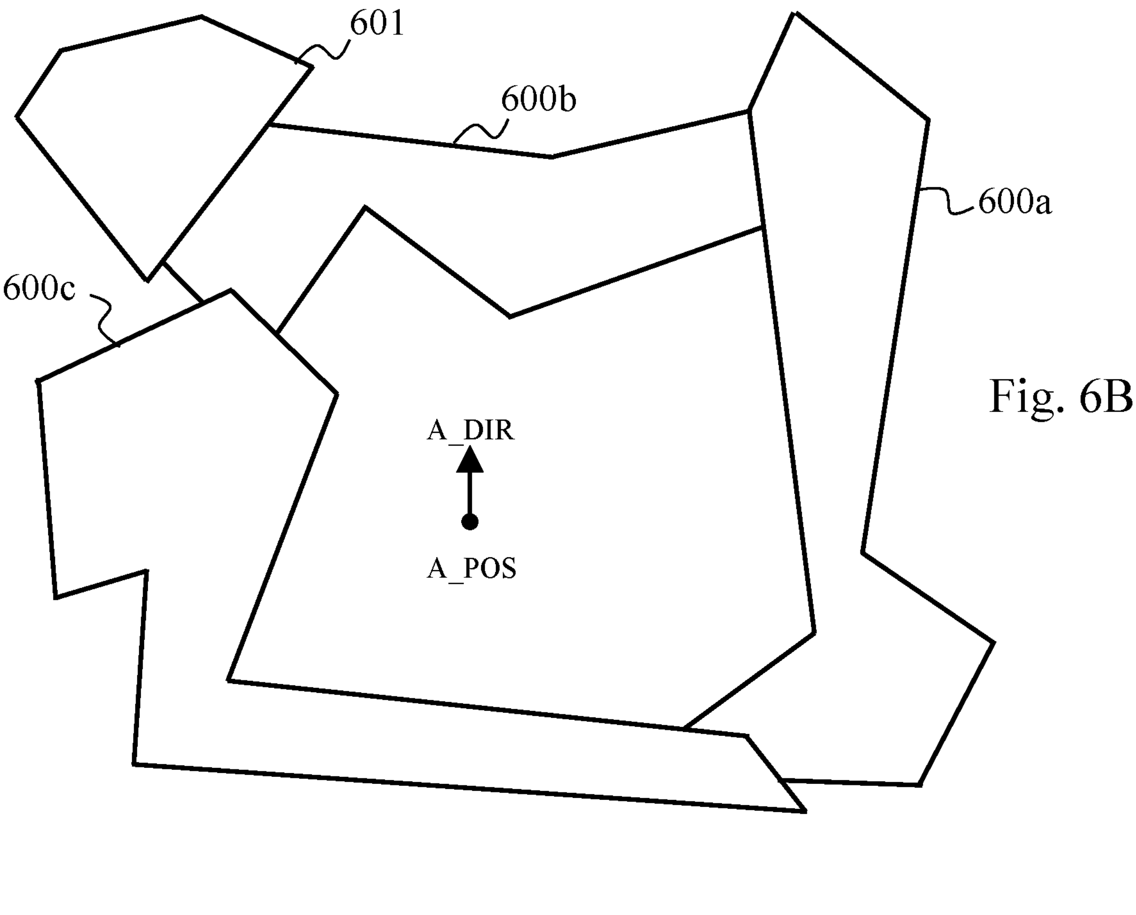
FIG. 6B schematically illustrates a second example of a situation where the aircraft is caught in a meteorological alert situation.

A second example of a meteorological alert situation is schematically illustrated in FIG. 6B, in which the aircraft 100 is surrounded by storm clouds represented by obstacles in the form of polygons 600*a*, 600*b*, 600*c*.

In one particular embodiment as illustrated in FIG. 6B, the ATG system 101 further considers, in the meteorological alert situation, any polygon 601 in contact with one or more polygons 600*a*, 600*b*, 600*c* which surround the aircraft 100. Likewise, in one particular embodiment, the ATG system 101 further considers, in the meteorological alert situation, any polygon 601 in contact with the polygon 600 within which the aircraft 100 is positioned.

In a step 304, the ATG system 101 checks whether, in the step 303, it was determined that the aircraft 100 is, or is not, in a meteorological alert situation. If it was determined that the aircraft 100 is in a meteorological alert situation, a step 306 is carried out; if not, a step 305 is carried out.

In the step 305, the ATG system 101 searches for a flyable trajectory from the current in-flight position A_POS of the aircraft 100 to the georeferenced destination T_POS, therefore avoiding the obstacles represented by the polygons obtained in the step 302. The trajectory search takes account of the current direction A_DIR of flight of the aircraft 100, as well as of the direction to be followed T_TRK to the destination, and of the performance of the aircraft 100 in view of its operational state.

The ATG system 101 starts the search for a (flyable) lateral trajectory by defining two first circles, of predetermined radius depending on the performance of the aircraft 100, tangential to the current direction A_DIR of flight of the aircraft 100, one being centered to the right and the other being centered to the left with respect to the current in-flight position A_POS of the aircraft 100. The aircraft 100 may turn either to the right or to the left with respect to the current direction A_DIR of flight of the aircraft 100. The radius of the first circles is equal to the minimum radius of a turn which the aircraft 100 can perform in view of its operational state.

Next, the ATG system 101 defines two second circles, of the same predetermined radius depending on the performance of the aircraft 100, tangential to the direction to be followed T_TRK to the destination, one being centered to the right and the other being centered to the left with respect to the georeferenced destination T_POS. The direction to be followed T_TRK to the destination defines the possible direction of travel around said second circles by the aircraft 100. According to one configuration, the radius of the second circles is equal to the radius of the first circles. According to another configuration, the radius of the second circles is different from the radius of the first circles. The radius of the second circles is calculated on the basis of the speed or of the predicted performance of the aircraft 100 on arrival at said second circles.

Then, the ATG system 101 searches for a tangential flyable trajectory between a said first circle and a said second circle, respecting the current direction A_DIR of flight of the aircraft 100 and the direction to be followed T_TRK to the destination. Considering that there is no obstacle between the current in-flight position A_POS of the aircraft 100 and the georeferenced destination T_POS, the possible trajectories are schematically illustrated in FIGS. 4A to 4D.

In FIG. 4A, the trajectory is such that the aircraft 100 turns to the left from the current in-flight position A_POS of the aircraft 100, follows the first circle centered to the left with respect to the current in-flight position A_POS of the aircraft 100, next follows a tangent to the second circle centered to the left with respect to the georeferenced destination T_POS and turns to the left, following said second circle to the georeferenced destination T_POS. In FIG. 4B, the trajectory is such that the aircraft 100 turns to the left from the current in-flight position A_POS of the aircraft 100, follows the first circle centered to the left with respect to the current in-flight position A_POS of the aircraft 100, next follows a tangent to the second circle centered to the right with respect to the georeferenced destination T_POS and turns to the right, following said second circle to the georeferenced destination T_POS. In FIG. 4C, the trajectory is such that the aircraft 100 turns to the right from the current in-flight position A_POS of the aircraft 100, follows the first circle centered to the right with respect to the current in-flight position A_POS of the aircraft 100, next follows a tangent to the second circle centered to the left with respect to the georeferenced destination T_POS and turns to the left, following said second circle to the georeferenced destination T_POS. In FIG. 4D, the trajectory is such that the aircraft 100 turns to the right from the current in-flight position A_POS of the aircraft 100, follows the first circle centered to the right with respect to the current in-flight position A_POS of the aircraft 100, next follows a tangent to the second circle centered to the right with respect to the georeferenced destination T_POS and turns to the right, following said second circle to the georeferenced destination T_POS.

When obstacles are present between the current in-flight position A_POS of the aircraft 100 and the georeferenced destination T_POS, the tangent between a said first circle and a said second circle does not represent a flyable trajectory. The ATG system 101 then searches for the flyable trajectory by bypassing vertices of polygons representing the obstacles, as obtained in the step 302.

A lateral margin LM must be respected laterally when calculating a trajectory with respect to the obstacles to be avoided, as illustrated in FIG. 4E, where, along a segment from a point P1 to a point P2, the lateral margin LM is free from any obstacle 400 in order to ensure a protection corridor. The lateral margin LM is predetermined. The lateral margin LM may be predefined, or can vary as a function of the altitude, of the speed, of the flight mode (nominal mode, degraded mode, etc.) of the aircraft 100, or of the geographic area under consideration, for example.

When calculating a trajectory by bypassing vertices of polygons, the ATG system 101 defines a third circle around the vertices of the polygons representative of obstacles as obtained in the step 302. Filtering may be applied by the ATG system 101 so as not to consider all the vertices of polygons representative of obstacles brought to the knowledge of the ATG system 101 by the PDTDB 201, PDMDB 202 and PDWDB 204. This third circle has a radius which is the maximum between the abovementioned lateral margin LM (defining the protection corridor) and the minimum radius of a turn which the aircraft 100 is capable of in view of its performance as defined in the PDB 203.

The ATG system 101 then searches for a tangential flyable trajectory between a said first circle and a said third circle, respecting the current direction A_DIR of flight of the aircraft 100. It is possible to search for a flyable trajectory from a turn to the right or from a turn to the left. A said flyable trajectory must make it possible to bypass the polygon vertex in question in view of the direction of arrival of the aircraft 100 at said polygon vertex (which therefore defines the direction of travel around said third circle). An example is schematically illustrated in FIG. 5A.

Figure 5A:
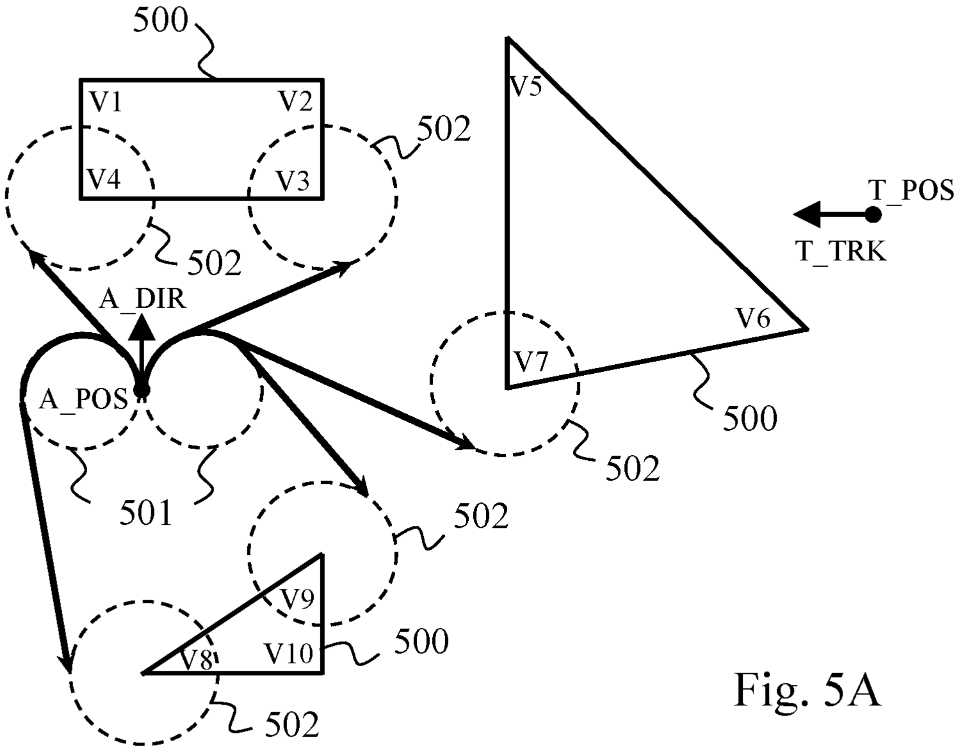
FIG. 5A schematically illustrates a first example of extending a trajectory by bypassing a polygon vertex.

In FIG. 5A, three obstacles 500 are represented purely by way of illustration. There is no flyable direct trajectory between the current in-flight position A_POS of the aircraft 100 and the georeferenced destination T_POS, further respecting the directions A_DIR and T_TRK. It is, then, necessary to bypass one or more obstacles. In FIG. 5A the abovementioned first circles 501 are represented. The third circles 502 for a certain number of vertices V3, V4, V7, V8 and V9 also appear therein. These are the vertices of polygons for which at least one tangential flyable trajectory has been found, as illustrated by the thick arrows in FIG. 5A (certain possible tangential flyable trajectories are not represented for the sake of the clarity of the drawing). These trajectories must be explored further, by successive expansions, in order to find a path leading to the georeferenced destination T_POS. For the vertices V1, V2, V5, V6 and V10, there is no tangential flyable trajectory (because of the obstacles present and of respecting the lateral margin LM (notably in relation to the vertex V5).

The ATG system 101 places each trajectory found, to be explored further, on a list L.

Figure 5B:
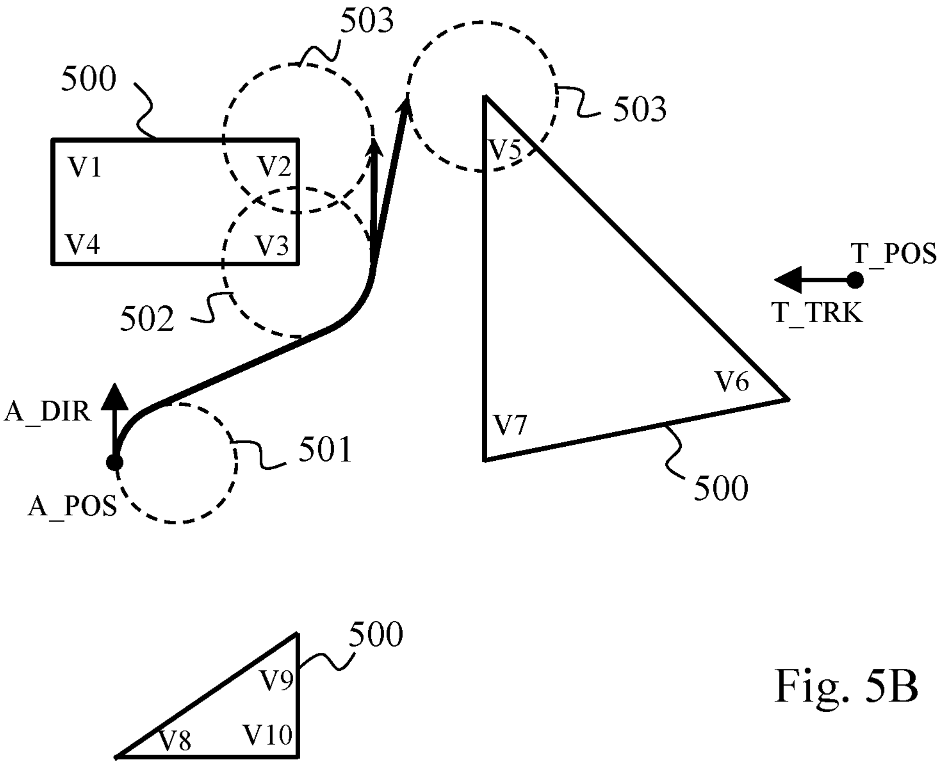
FIG. 5B schematically illustrates a second example of extending a trajectory by bypassing a polygon vertex.

In order to further explore the possibilities for reaching the georeferenced destination, the ATG system 101 extracts a candidate trajectory from the list L, for example the most promising candidate trajectory in view of a pathfinding heuristic. The ATG system 101 searches for a tangential flyable trajectory between the third circle (circle from which an expansion begins, the radius of which is equal to the maximum between the lateral margin LM and the radius of a turn which the aircraft 100 can perform) at which the candidate trajectory stops and a said second circle, respecting the direction T_TRK to be followed on arrival. The ATG system 101 thus searches for whether all the obstacles have been bypassed and whether there is a direct flyable trajectory to the georeferenced destination (last leg of a trajectory). This would be, for example, the case from the third circle which surrounds the vertex V5 in FIG. 5A, but not from the vertex V7. If no flyable trajectory makes it possible to reach the georeferenced destination T_POS, the ATG system 101 searches for another vertex to be bypassed which could bring the position closer to the destination T_POS. The ATG system 101 then searches for a tangential flyable trajectory between the third circle at which the candidate trajectory stops and another said third circle, as schematically illustrated in FIG. 5B. The direction of travel around the third circle at which the candidate trajectory stops depends on the direction of arrival of the aircraft 100 at said third circle. If one or more such trajectories are found, they are added to the list L.

Note that, when the third circle at which the candidate trajectory stops is travelled around by turning to the left (or to the right, respectively), the ATG system 101 excludes any flyable trajectory towards another said third circle which imposes a turn to the right (or to the left, respectively). In fact, there may be such a flyable trajectory, but it is not considered to be of interest. There is, in this case, no flyable tangential trajectory which respects the direction of travel around the third circle at which the candidate trajectory stops. In addition, there must certainly be shorter alternative trajectories which are, therefore, present in the list L, in the direction of these polygon vertices. Thus, in FIG. 5B, the ATG system 101 excludes the possible trajectories which, from the third circle 502 which surrounds the polygon vertex V3, lead to the vertices V7 and V9, for example.

An example of a search for a flyable trajectory by successive expansions by bypassing vertices of polygons is schematically illustrated in FIG. 5B: travelling around part of the first circle 501 centered to the right with respect to the current in-flight position A_POS of the aircraft 100, then travelling along a tangent between said first circle 501 and the third circle 502 around the polygon vertex V3, then travelling around part of said third circle 502 around the polygon vertex V3, then either travelling along a tangent between said third circle 502 around the polygon vertex V3 and the third circle 503 around the vertex V5, or travelling along a tangent between said third circle 502 around the polygon vertex V3 and the third circle 503 around the polygon vertex V2. It appears in FIG. 5B that, from this third circle 503 around the vertex V5, the georeferenced destination T_POS can be reached directly, while at the same time respecting the direction T_TRK to be followed to the destination. A flyable trajectory should therefore be found in the next iteration of exploring this candidate trajectory.

In one particular embodiment, the ATG system 101 adds a said candidate trajectory T1 to the list L1 only if the list L does not already contain a shorter candidate trajectory T2 which makes it possible to reach the third circle around the polygon vertex at which said trajectory T1 stops. Also, in one particular embodiment, when the ATG system 101 adds a said candidate trajectory to the list L, the ATG system 101 removes from the list L any candidate trajectory which stops at the third circle of the same polygon vertex but which is longer than the added candidate trajectory.

In this way, a flyable trajectory may be found for bringing the aircraft 100 from the current in-flight position A_POS of the aircraft 100 to the georeferenced destination T_POS. Also, following the step 305, the flyable trajectory for bringing the aircraft 100 from the current in-flight position A_POS of the aircraft 100 to the georeferenced destination T_POS is provided, and an end is put to the algorithm of FIG. 3.

In the step 306, the ATG system 101 searches for a prior trajectory for exiting the meteorological alert situation. Thus, the ATG system 101 calculates a flyable trajectory, from the point of view of the relief of the terrain and—if needed—of no-fly military areas, which makes it possible to bring the aircraft 100 to a safety position S_POS outside the meteorological alert situation from which a flyable trajectory to the referenced destination can then be calculated. Thus, priority is given to exiting the meteorological alert situation, avoiding burdening the trajectory calculation by pointlessly focusing on the georeferenced destination at first. In the safety position S_POS, the prior exit trajectory from the meteorological alert situation provides an indication of the direction S_DIR followed by the aircraft 100 to reach said safety position S_POS. The search for a prior exit trajectory from the meteorological alert situation is described in detail below in relation to FIG. 7.

Then, once the safety position S_POS and the trajectory for reaching it have been established, the ATG system 101 searches, in a step 307, for a flyable trajectory from the safety position S_POS to the georeferenced destination T_POS, avoiding the obstacles represented by the polygons obtained in the step 302, and taking account of the directions S_DIR and T_TRK. The step 307 is therefore carried identically to the step 305, but starting from the safety position S_POS instead of the current in-flight position A_POS of the aircraft 100. The flyable trajectory to be considered is therefore the succession of the flyable trajectory from the current in-flight position A_POS of the aircraft 100 to the safety position S_POS (flyable exit trajectory from the meteorological alert situation), as determined in the step 306, then of the flyable trajectory from the safety position S_POS to the georeferenced destination T_POS, as determined in the step 307. Also, following the step 307, the flyable trajectory for bringing the aircraft 100 from the current in-flight position A_POS of the aircraft 100 to the georeferenced destination T_POS is provided, and an end is put to the algorithm of FIG. 3.

Figure 7:
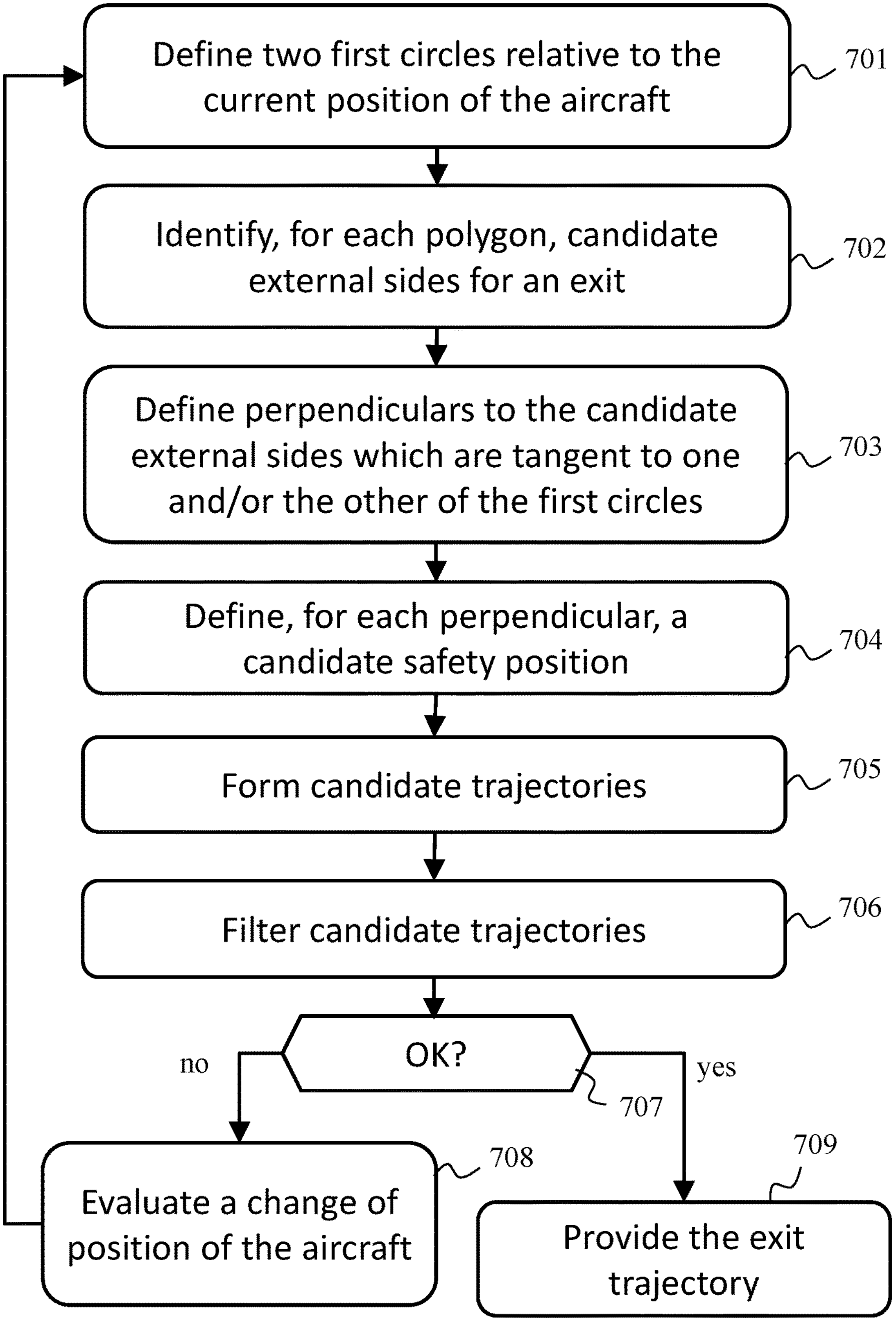
FIG. 7 schematically illustrates an algorithm for calculating a lateral trajectory aiming for the aircraft to exit the meteorological alert situation.

FIG. 7 schematically illustrates an algorithm for calculating a lateral trajectory aiming for the aircraft 100 to exit a meteorological alert situation, as illustrated in FIGS. 6A and 6B.

In a step 701, the ATG system 101 defines two first circles 501, of predetermined radius depending on the performance of the aircraft 100, tangential to the current direction A_DIR of flight of the aircraft 100, one being centered to the right and the other being centered to the left with respect to the current in-flight position A_POS of the aircraft 100. The aircraft 100 may turn either to the right or to the left with respect to the current direction A_DIR of flight of the aircraft 100. The radius of the first circles is equal to the minimum radius of a turn which the aircraft 100 can perform in view of its operational state. These two first circles 501 are therefore the same as those defined in the context of the above-described step 305. The performance of the aircraft 100 may, however, be lowered because of the meteorological alert situation, notably when the aircraft 100 is inside a storm cloud as illustrated in FIG. 6A.

In a step 702, the ATG system 101 identifies, for each polygon of the meteorological alert situation, candidate external sides 800 which are candidates for the aircraft 100 to exit. The candidate external sides 800 are the external sides of the polygons with respect to the current in-flight position A_POS of the aircraft 100, that is to say the polygon sides beyond which the aircraft 100 gets out of any meteorological obstacle starting from the current in-flight position A_POS of the aircraft 100. The polygons of the meteorological alert situation are representative of meteorological obstacles to be overcome by the aircraft 100 in order to exit the meteorological alert situation (see FIGS. 6A and 6B).

In a step 703, the ATG system 101 defines straight lines 801 which are perpendicular to the candidate external sides and which are tangential to one and/or the other of the first circles 501. It should be noted that the straight lines 801 may not form an intersection with the segment formed by a said candidate external side, but form an intersection with the straight line which prolongs said candidate external side (intersection on the axis of said candidate external side but outside said candidate external side).

In a step 704, the ATG system 101 determines, for each straight line 801, a candidate safety position. The candidate safety position is located on said straight line 801 at a distance at least equal to the lateral margin LM, and ensures that none of the obstacles as obtained in the step 302 is present in a radius equal to the lateral margin LM (safety space represented by circles 802 in FIG. 8A).

In a step 705, the ATG system 101 forms candidate flyable trajectories, in order for the aircraft 100 to exit the meteorological alert situation, between the current position A_POS of the aircraft 100 and each candidate safety position following the straight line 801 on which the candidate safety position in question is located and, previously, a first circle portion 501 until said first circle 501 is tangential to the straight line 801 in question.

Figure 8A:
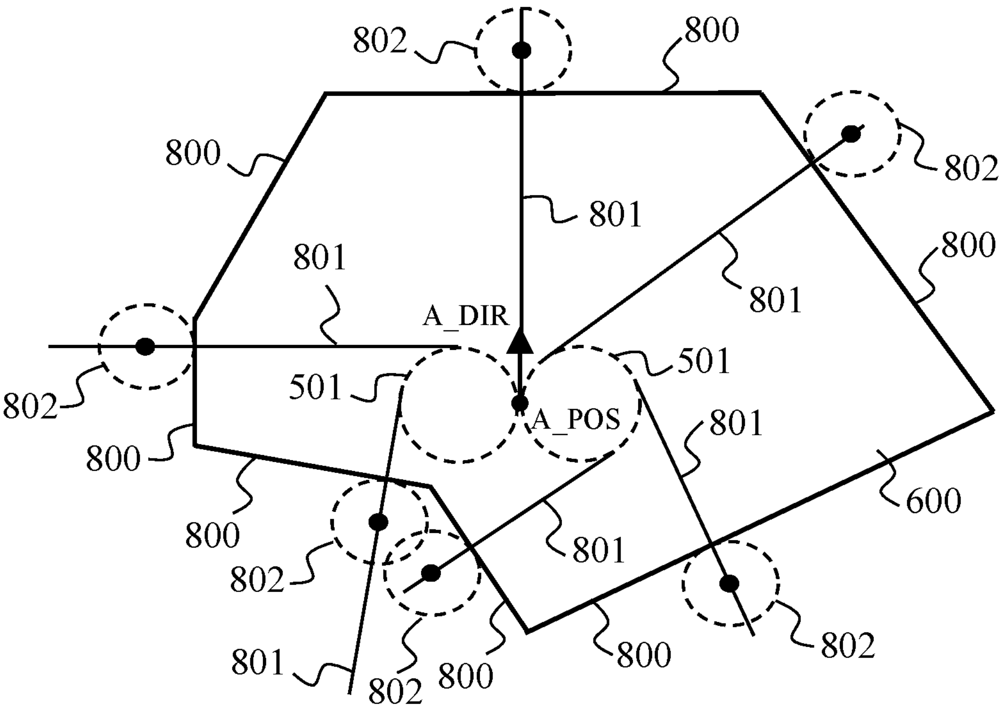
FIG. 8A schematically illustrates various alternatives for exiting the meteorological alert situation.
Figure 8B:
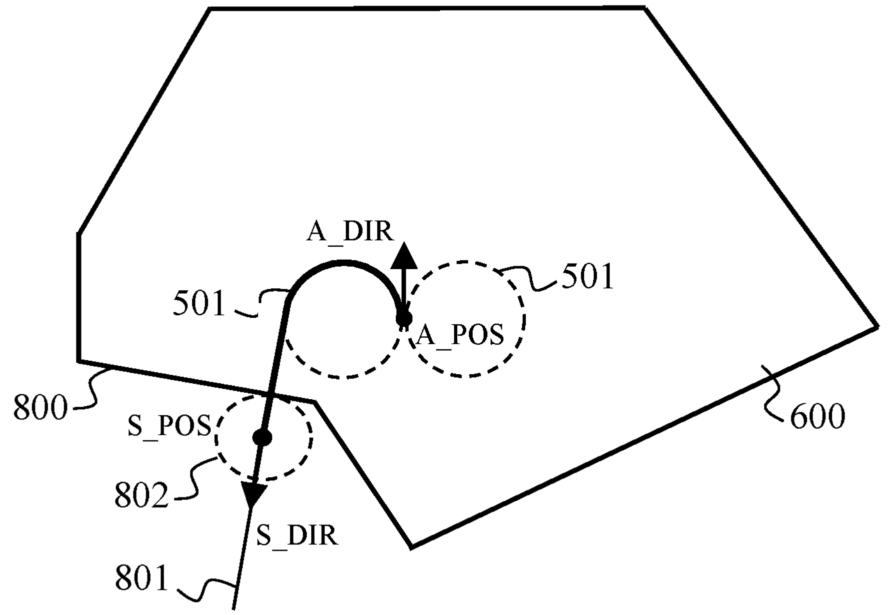
FIG. 8B schematically illustrates a trajectory for exiting the meteorological alert situation in order to bring the aircraft to a safety position.

An example of candidate exit trajectories for exiting the meteorological alert situation of FIG. 6A is schematically represented in FIG. 8A. A similar example may be easily derived from FIG. 6B, using the external sides of the polygons 600*a*, 600*b*, 600*c* (and potentially of the polygon 601) of FIG. 6B. In this case, in one particular embodiment which makes it possible to make is easier to calculate candidate trajectories, the ATG system 101 merges the polygons 600*a*, 600*b*, 600*c* (and potentially the polygon 601) surrounding the aircraft 100, before identifying the candidate external sides 800.

In a step 706, the ATG system 101 filters the candidate flyable trajectories, so as to exclude from the search for an exit trajectory from the meteorological alert situation any candidate trajectory which does not guarantee the lateral margin LM with respect to the relief obstacles and potentially to the no-fly military areas.

It is considered here that no-fly military areas or relief obstacles may be present in the environment of the meteorological alert situation. The ATG system 101 may, however, be used when only meteorological obstacles are present. Then, each candidate safety position is located on a said straight line 801 at a distance at least equal to the lateral margin LM outside any polygon representative of a meteorological obstacle of the meteorological alert situation.

In a step 707, the ATG system 101 checks whether there is, after filtering, at least one possible exit trajectory from the meteorological alert situation. If this is the case, a step 709 is carried out; if not, a step 708 is carried out.

In the step 708, the ATG system 101 evaluates a change of position of the aircraft 100. A change of position of the aircraft 100 may make it possible to obtain a new set of said straight lines 801 perpendicular to the external sides of the polygons of the meteorological alert situation in order to find a viable exit trajectory. The change of position may consist in considering the aircraft in a position further forward in the direction A_DIR, or in a position following a turn to the right with respect to the current in-flight position A_POS of the aircraft 100, or in a position following a turn to the left with respect to the current in-flight position A_POS of the aircraft 100, as long as the trajectory for reaching this position from the current in-flight position A_POS of the aircraft 100 guarantees the lateral margin LM with respect to the relief obstacles and potentially to the no-fly military areas. The step 701 is then repeated.

In a variant embodiment, if there are lower-priority obstacles than the meteorological obstacles (for example, no-fly military areas) which have prevented a viable exit trajectory from being determined, then the ATG system 101 may reiterate the search for a viable exit trajectory without considering these lower-priority obstacles than the meteorological obstacles and make it possible to infringe them. The higher-priority obstacles than the meteorological obstacles (for example, terrain obstacles) must not, however, be discounted in the search for a viable exit trajectory.

In a variant embodiment, if there is a candidate flyable trajectory which was filtered out in the step 706 because of conflicts with a no-fly military area or terrain obstacle, the ATG system 101 modifies said candidate flyable trajectory by bypassing at least one vertex of the polygon representative of the obstacle in question by defining a said third circle around said at least one vertex, and by searching for the straight line 801 which is perpendicular to the candidate external side 800 under consideration and which is tangential to said third circle.

In the step 709, the ATG system 101 has available at least one flyable trajectory which makes it possible to exit the meteorological alert situation. When the ATG system 101 has available several candidate flyable trajectories which make it possible to exit the meteorological alert situation (which is generally the case), the ATG system 101 chooses between the candidate flyable trajectories, selecting the most promising candidate flyable trajectory in view of a heuristic where minimizing a time of exposure of the aircraft 100 to any meteorological obstacle of the meteorological alert situation prevails.

At the end of the step 709, the ATG system 101 provides the trajectory which makes it possible to exit the meteorological alert situation to the safety position S_POS defined for the trajectory selected. An end is then put to the algorithm of FIG. 7. A trajectory to the georeferenced destination T_POS may then be searched for from said safety position S_POS taking account of the direction S_DIR imposed by following this trajectory which makes it possible to exit the meteorological alert situation.

The algorithm of FIG. 7 was presented above as forming part of searching for a flyable lateral trajectory from the current in-flight position A_POS of the aircraft 100 to the georeferenced destination T_POS, in order to manage the case where, in the current in-flight position A_POS of the aircraft 100, said aircraft 100 is in a meteorological alert situation. The algorithm of FIG. 7 may, however, be triggered in order to find an appropriate flyable trajectory simply for the aircraft 100 to exit the meteorological alert situation and bringing it to a safety position (S_POS).

Figure 9:
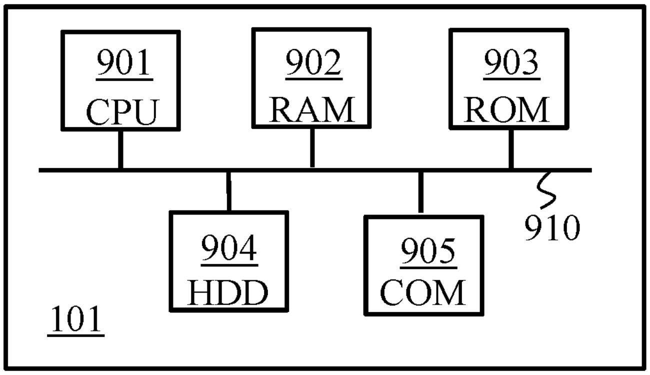
FIG. 9 schematically illustrates an arrangement of a hardware platform adapted to implement the automatic trajectory generation system.

FIG. 9 schematically illustrates an example of a hardware architecture of the ATG system 101, which then comprises, connected by a communication bus 910: a processor or CPU (central processing unit) 901; a random access memory (RAM) 902; a read-only memory (ROM) 903, for example a flash memory; a data storage device, such as a hard disk drive (HDD), or a storage medium reader, such as an SD (Secure Digital) card reader 904; at least one communication interface 905 which makes it possible for the ATG system 101 to interact with items of equipment of the avionics of the aircraft 100.

The processor 901 is capable of executing instructions loaded into the RAM 902 from the ROM 903, from an external memory (not represented), from a storage medium, such as an SD card, or from a communication network (not represented). When the ATG system 101 is powered up, the processor 901 is capable of reading instructions from the RAM 902 and of executing them. These instructions form a computer program which causes the processor 901 to implement the behaviors, steps and algorithms described here.

All or some of the behaviors, steps and algorithms described here may thus be implemented in software form by executing a set of instructions by way of a programmable machine, such as a DSP (digital signal processor) or a microcontroller, or be implemented in hardware form by way of a machine or a dedicated component (chip) or a dedicated set of components (chipset), such as an FPGA (field-programmable gate array) or an ASIC (application-specific integrated circuit). Generally, the ATG system 101 comprises electronic circuitry arranged and configured to implement the behaviors, steps and algorithms described here. While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms “comprise” or “comprising” do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for generating a trajectory for an aircraft in flight to exit a meteorological alert situation, the method being implemented by an automatic trajectory generation system comprising electronic circuitry, the method comprising:

obtaining one or more polygons of the meteorological alert situation representative of at least one respective meteorological obstacle to be overcome;

defining two tangential circles with respect to a current flight direction (A_DIR) of the aircraft, one tangential circle being centered to a right and the other tangential circle being centered to a left with respect to a current in-flight position (A_POS) of the aircraft, a radius of each tangential circle being a minimum radius of a turn which the aircraft is configured to perform in view of an operational state of the aircraft;

identifying, for each polygon of the meteorological alert situation, candidate external sides which are candidates for the aircraft to exit the meteorological alert situation;

defining straight lines which are perpendicular to the candidate external sides and which are tangential to one or both of the tangential circles;

determining, for each straight line, a candidate safety position, which is located on said straight line at a distance at least equal to a predetermined lateral margin (LM) outside any polygon representative of the at least one respective meteorological obstacle of the meteorological alert situation;

forming candidate trajectories, in order for the aircraft to exit the meteorological alert situation, between the current in-flight position (A_POS) of the aircraft and each candidate safety position following the straight line on which the candidate safety position in question is located and, previously, a circle portion until said circle is tangential to the straight line in question;

choosing between the candidate trajectories, selecting a candidate trajectory in view of a heuristic where minimizing a time of exposure of the aircraft to any of the at least one respective meteorological obstacle of the meteorological alert situation prevails; and controlling the aircraft to follow the selected trajectory.

2. The method according to claim 1, wherein the meteorological alert situation is formed from the at least one respective meteorological obstacle in which the current in-flight position (A_POS) of the aircraft is located, the current in-flight position (A_POS) of the aircraft thus being within the one or more polygons of the meteorological alert situation.

3. The method according to claim 1, wherein the meteorological alert situation is formed from several of the at least one respective meteorological obstacles surrounding the current in-flight position (A_POS) of the aircraft, the current in-flight position (A_POS) of the aircraft thus being surrounded by polygons of the meteorological alert situation.

4. The method according to claim 3, further comprising:

merging the polygons of the meteorological alert situation surrounding the current in-flight position (A_POS) of the aircraft, before identifying the candidate external sides.

5. The method according to claim 1, further comprising:

obtaining one or more other polygons which are representative of at least one no-fly military area or relief obstacle, wherein each candidate safety position is located at a distance at least equal to the predetermined lateral margin (LM) of any polygon of the one or more obtained polygons.

6. The method according to claim 5, further comprising:

filtering the candidate trajectories, so as to exclude any candidate trajectory which does not guarantee the predetermined lateral margin (LM) with respect to any other said obtained polygon.

7. A method for generating the trajectory for bringing the aircraft in flight from the current in-flight position (A_POS) of the aircraft to a georeferenced destination (T_POS), the method being implemented by the automatic trajectory generation system comprising the electronic circuitry, the method comprising:

obtaining polygons representative of obstacles potentially encountered by the aircraft from the current in-flight position (A_POS) of the aircraft to the georeferenced destination (T_POS);

when the current in-flight position (A_POS) of the aircraft is not in the meteorological alert situation, searching for the trajectory in order to bring the aircraft from the current in-flight position (A_POS) of the aircraft to the georeferenced destination (T_POS), by bypassing vertices of the polygons which are obtained, by maintaining the predetermined lateral margin (LM) from any polygon;

when the current in-flight position (A_POS) of the aircraft is in the meteorological alert situation, executing the method according to claim 1 in order to obtain the trajectory in order to bring the aircraft from the current in-flight position (A_POS) of the aircraft to a safety position (S_POS), and searching for the trajectory in order to bring the aircraft from the safety position (S_POS) to the georeferenced destination (T_POS), by bypassing vertices of the polygons which are obtained, by maintaining the predetermined lateral margin (LM) from any polygon.

8. An automatic trajectory generation system configured to automatically generate a trajectory in order for an aircraft in flight to exit a meteorological alert situation, the automatic trajectory generation system comprising:

electronic circuitry configured to:

obtain one or more polygons of the meteorological alert situation representative of at least one respective meteorological obstacle to be overcome;

define two tangential circles with respect to a current flight direction (A_DIR) of the aircraft, one tangential circle centered to a right and the other tangential circle centered to a left with respect to a current in-flight position (A_POS) of the aircraft, a radius of each tangential circle being a minimum radius of a turn which the aircraft is configured to perform in view of an operational state of the aircraft;

identify, for each polygon of the meteorological alert situation, candidate external sides which are candidates for the aircraft to exit the meteorological alert situation;

define straight lines which are perpendicular to the candidate external sides and which are tangential to one or both of the tangential circles;

determine, for each straight line, a candidate safety position, which is located on said straight line at a distance at least equal to a predetermined lateral margin (LM) outside any polygon representative of the at least one respective meteorological obstacle of the meteorological alert situation;

form candidate trajectories, in order for the aircraft to exit the meteorological alert situation, between the current in-flight position (A_POS) of the aircraft and each candidate safety position following the straight line on which the candidate safety position in question is located and, previously, a circle portion until said circle is tangential to the straight line in question; and choose between the candidate trajectories, selecting a candidate trajectory in view of a heuristic where minimizing a time of exposure of the aircraft to any of the at least one respective meteorological obstacle of the meteorological alert situation prevails; and control the aircraft to follow the selected trajectory.

9. An aircraft comprising the automatic trajectory generation system according to claim 8.

10. An automatic trajectory generation system configured to automatically generate a trajectory in order to bring an aircraft in flight from a current in-flight position (A_POS) of the aircraft to a georeferenced destination (T_POS), the automatic trajectory generation system comprising:

electronic circuitry configured to:

obtain polygons representative of obstacles potentially encountered by the aircraft from the current in-flight position (A_POS) of the aircraft to the georeferenced destination (T_POS);

when the current in-flight position (A_POS) of the aircraft is not in a meteorological alert situation, search for the trajectory in order to bring the aircraft from the current in-flight position (A_POS) of the aircraft to the georeferenced destination (T_POS), by bypassing vertices of the polygons which are obtained, by maintaining a predetermined lateral margin (LM) from any polygon;

obtain one or more polygons of the meteorological alert situation representative of at least one respective meteorological obstacle to be overcome;

define two tangential circles with respect to a current flight direction (A_DIR) of the aircraft, one tangential circle centered to a right and the other tangential circle centered to a left with respect to the current in-flight position (A_POS) of the aircraft, a radius of each tangential circle being a minimum radius of a turn which the aircraft is configured to perform in view of an operational state of the aircraft;

identify, for each polygon of the meteorological alert situation, candidate external sides which are candidates for the aircraft to exit the meteorological alert situation;

define straight lines which are perpendicular to the candidate external sides and which are tangential to one or both of the tangential circles;

determine, for each straight line, a candidate safety position, which is located on said straight line at a distance at least equal to the predetermined lateral margin (LM) outside any polygon representative of the at least one respective meteorological obstacle of the meteorological alert situation;

form candidate trajectories, in order for the aircraft to exit the meteorological alert situation, between the current in-flight position (A_POS) of the aircraft and each candidate safety position following the straight line on which the candidate safety position in question is located and, previously, a circle portion until said circle is tangential to the straight line in question;

choose between the candidate trajectories, selecting a candidate trajectory in view of a heuristic where minimizing a time of exposure of the aircraft to any of the at least one respective meteorological obstacle of the meteorological alert situation prevails; and control the aircraft to follow the selected trajectory;

when the current in-flight position (A_POS) of the aircraft is in the meteorological alert situation, obtain the trajectory in order to bring the aircraft from the current in-flight position (A_POS) of the aircraft to a safety position (S_POS), and search for the trajectory in order to bring the aircraft from the safety position (S_POS) to the georeferenced destination (T_POS), by bypassing vertices of the polygons which are obtained, by maintaining the predetermined lateral margin (LM) from any polygon.

11. An aircraft comprising the automatic trajectory generation system according to claim 10.

* * * * *